Nov. 29, 1932.  L. C. STUKENBORG  1,889,185
AUTOMOBILE LIFT
Filed May 29, 1929   3 Sheets-Sheet 1
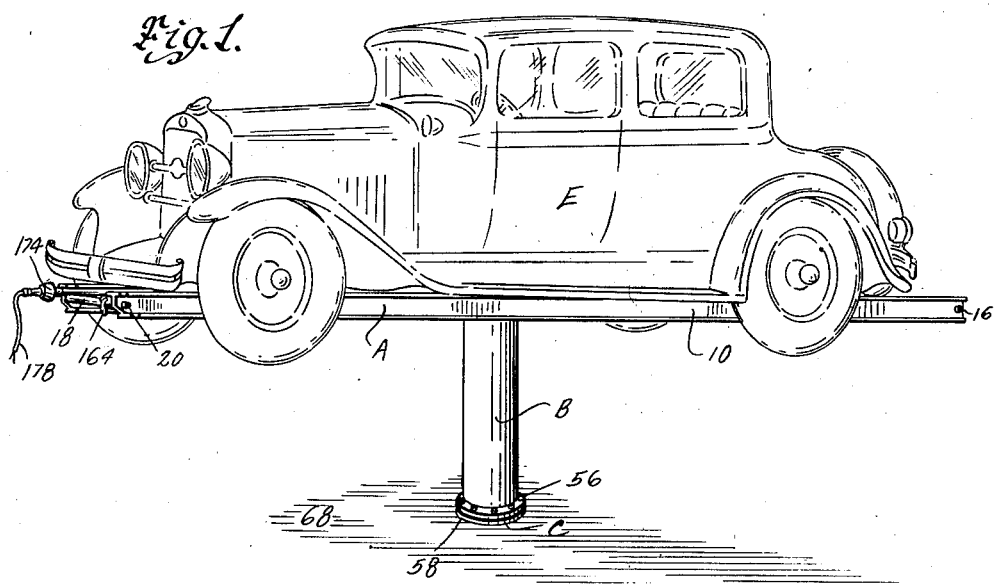
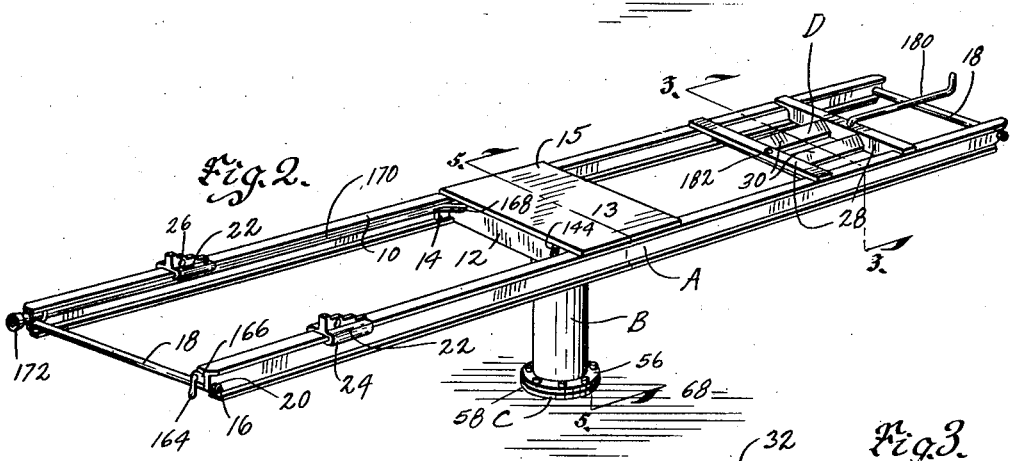
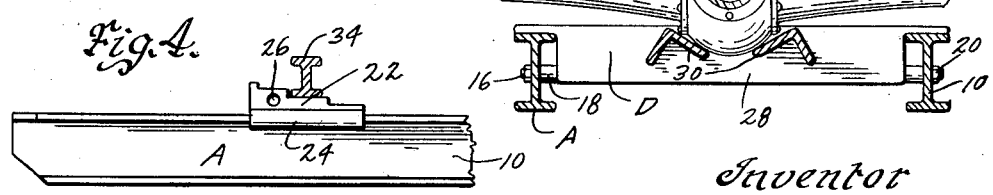
Inventor
Louis C. Stukenborg
by Bair, Freeman & Sinclair
Attorneys Nov. 29, 1932.                L. C. STUKENBORG                1,889,185
                                AUTOMOBILE LIFT
                              Filed May 29, 1929            3 Sheets-Sheet 2
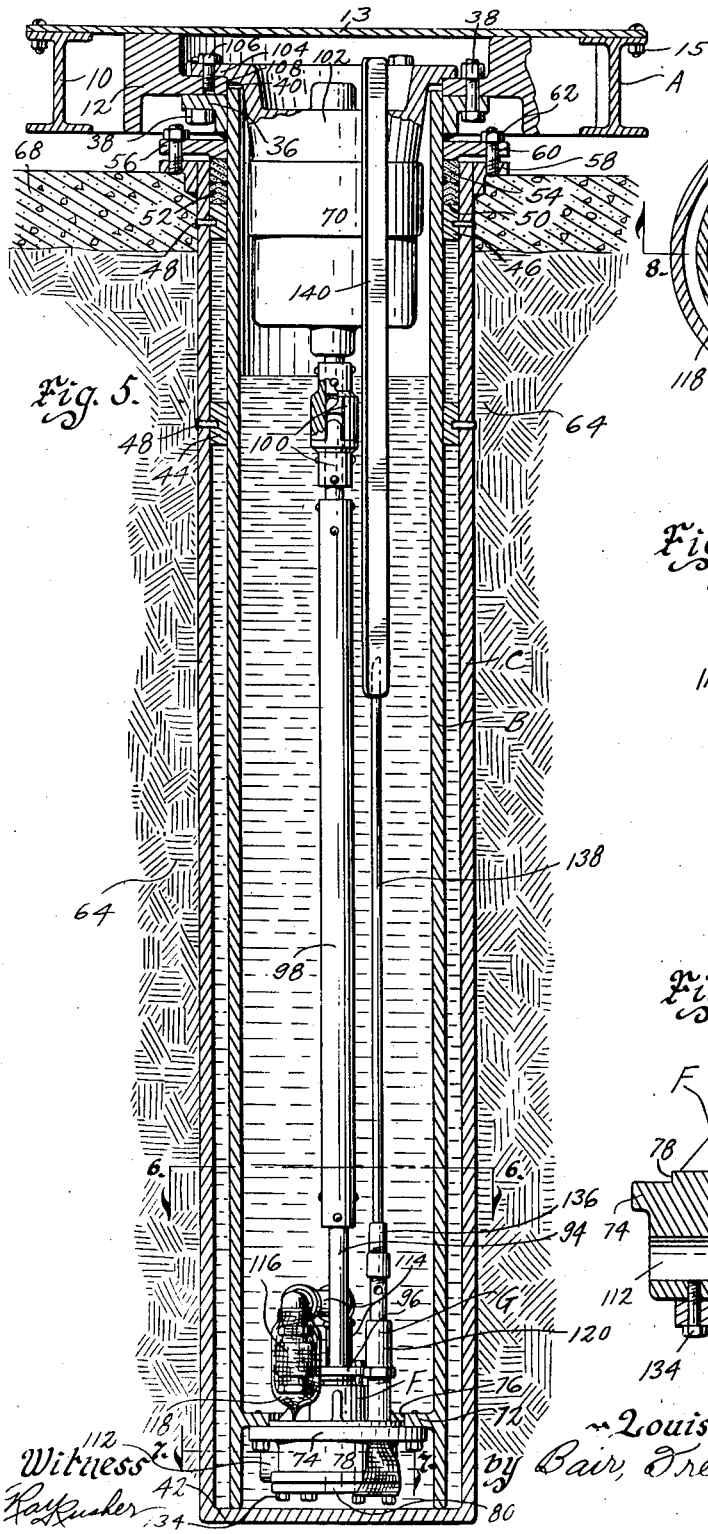
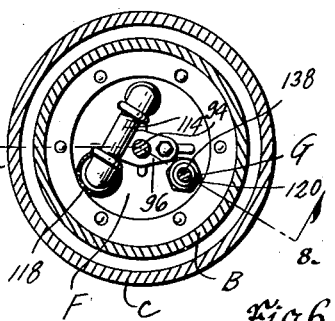
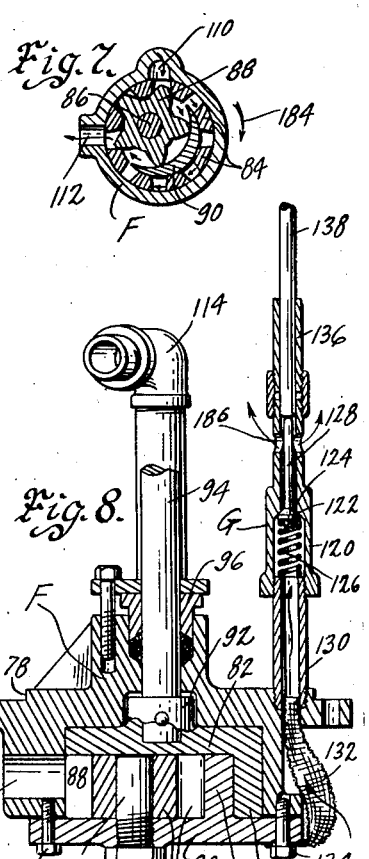
Inventor
Louis C. Stukenborg
by Bair, Freeman & Sinclair
Attorneys

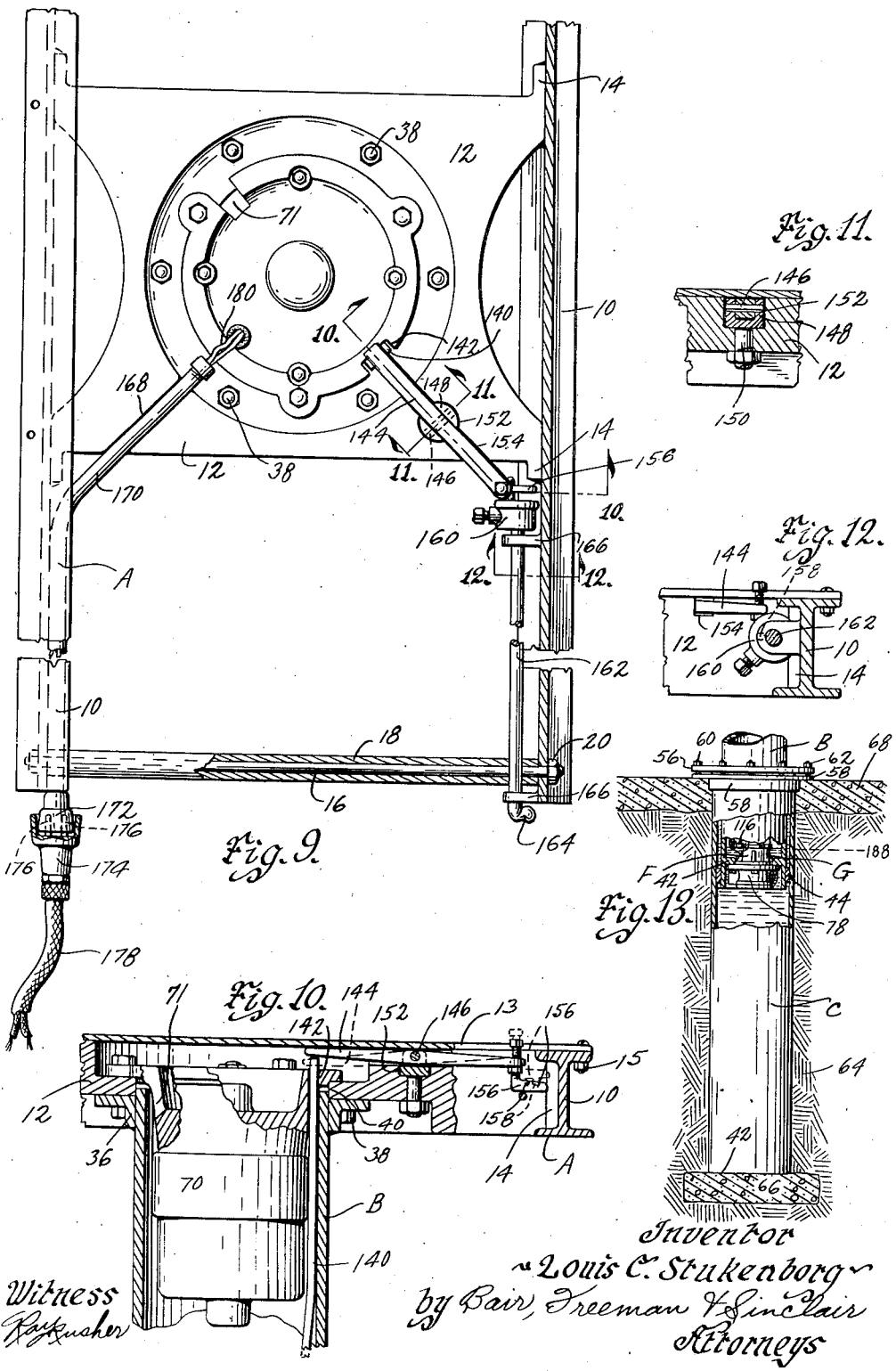

Patented Nov. 29, 1932

1,889,185

UNITED STATES PATENT OFFICE

LOUIS C. STUKENBORG, OF MEMPHIS, TENNESSEE, ASSIGNOR TO OILDRAULIC LIFT COMPANY, OF MEMPHIS, TENNESSEE, A CORPORATION OF DELAWARE

AUTOMOBILE LIFT

Application filed May 29, 1929. Serial No. 366,889.

The object of my invention is to provide an automobile lift of simple, durable and comparatively inexpensive construction.

More particularly, my invention relates to a device adapted to support and elevate an automobile above the ground or floor level wherein access may be readily and easily had to the chassis and under-body of the automobile when in elevated position.

Still another object is to provide a self-contained lifting unit adapted to be supported within a cylinder embedded in the ground in such manner as to permit rotary movement of the entire lifting unit and at the same time to so arrange the parts that the piston of the lifting unit serves as a container for carrying all of the operating mechanism for causing the lifting unit to be elevated when desired.

Another object is to provide an electrically operated lifting unit wherein the motor is mounted within the upper end of the hollow piston and movable therewith, the electric motor being in direct alignment with a pump structure mounted within the lower end of the piston for forcing a lifting liquid from within the piston to the cylinder for thus elevating or lifting the entire unit.

Still another object is to provide an automobile lift which, when manufactured or fabricated, is substantially composed of three units or elements as follows: First, the hollow cylinder closed at its lower end and adapted to be embedded in the ground with its upper end substantially flush with the surface thereof. Second, the hollow piston closed at its lower end adapted to contain oil or other lifting fluid or liquid with a pump mounted within the closed end of the piston and operated by an electric motor carried by said piston and mounted within the walls thereof near the upper end of the piston. Third, a superstructure consisting of a pair of rails connected together at their ends and connected to a head structure intermediate their ends, which head structure is rigidly secured to the upper end of the piston unit.

Another object of my invention is the arrangement of the superstructure so that it can lie substantially flat upon the ground surface without necessity of providing pits or the like around the cylinder or piston.

A further and important object is the arrangement wherein the cylinder is the only element or unit that must be embedded in the ground and within such cylinder is mounted the piston adapted to contain all of the operating mechanism for raising the lift, thus providing a lifting unit which may be properly termed "self-contained."

Still another object is to provide a piston unit adapted to serve as a reservoir for the lifting liquid and so arranged that by placing a predetermined amount of lifting liquid within the piston the "raise" of the lifting unit may be properly governed.

Still a further object is to provide accessory devices slidably mounted upon the superstructure and carried thereby for engaging the front axle of an automobile and for engaging and for receiving the differential housing irrespective of the size or make of the automobile and at the same time, providing a three-point support for the automobile when it is lifted off the ground.

Still another object is to provide a release valve mounted within the closed end of the piston and operable from a remote position at one end of the superstructure irrespective of the position of the superstructure either as to its lifted position or as to its rotated position.

This is a continuation in part of my application heretofore filed on January 30, 1928, Serial Number 250,468, now Patent 1,803,682 of May 5, 1931.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a perspective view of my improved "free wheel" automobile lift in elevated position with an automobile supported thereon.

Figure 2 is a perspective view of the lift in partially elevated position, illustrating the accessory devices carried by the lift.

Figure 3 is a detail sectional view taken on line 3—3 of Figure 2, illustrating one of the accessory devices for supporting the rear end of an automobile.

Figure 4 is a side view of another one of the accessory devices for supporting the front axle of the automobile.

Figure 5 is a central sectional vertical view taken on line 5—5 of Figure 2, illustrating the entire lift unit with the operating mechanism therefor.

Figure 6 is a detail horizontal sectional view taken on line 6—6 of Figure 5.

Figure 7 is a detail sectional view taken on line 7—7 of Figure 5.

Figure 8 is a vertical sectional view taken on line 8—8 of Figure 6, illustrating the pump mechanism and release valve, both of which are supported in the closed end of the piston.

Figure 9 is a top plan view of the central portion of the superstructure, illustrating the electrical connections for the motor and the release valve operating mechanism.

Figure 10 is a detail sectional view taken on line 10 of Figure 9.

Figures 11 and 12 are detail sectional views taken on lines 11—11 and 12—12 respectively of Figure 9; and Figure 13 is a side elevation partly in section, illustrating the lower end of the piston unit in its entirely raised position.

On the accompanying drawings, I have used the reference character A to indicate a superstructure adapted to engage the undersurface of the chassis of an automobile for supporting the same. In the general construction of my device the superstructure A is secured to the upper end of a piston or plunger B slidably received within a cylinder C. The superstructure A consists of a pair of side rails 10 formed of I beam construction or the like and connected together at their central portions by a head or mid section 12.

The head 12 is provided with flanges 14, which are welded or otherwise suitably secured to the webs of the rails 10.

At each end of the superstructure A is a connecting member consisting of a rod 16 and a spacer tube 18. Nuts 20 are provided on the ends of the rod 16 for firmly clamping the spacer tube 18 between the rails 10.

Accessory devices 22 are slidably mounted on one end of the superstructure A and each consists of a casting having flange portions 24 extending under the upper flange of the rail 10. The devices 22 rest on top of the rails 10 and are provided with a plurality of steps of different heights on their upper surfaces.

An opening 26 is provided in each device 22, the purpose of which will be hereinafter described. On the opposite end of the superstructure A, I mount an accessory device D consisting of transverse spaced members 28, resting on top of rails 10 and supporting cross members 30 extending between the members 28.

The transverse members 28 may be formed of angle iron construction and the downwardly extending flanges thereof may be notched, as clearly shown in Figure 3, whereby to fit between the spaced rails 10 and prevent side movement of the accessory device D relative to the rails.

The members 30 may be formed of angle iron welded or otherwise secured to the members 28 and arranged to form a seat for receiving the differential housing 32 of an automobile E. The accessory devices 22 are adapted to engage the front axle 34 of the automobile E, as shown in Figure 4.

Figure 1 illustrates the automobile E supported in an elevated position on the superstructure A with the devices 22 and D engaging the front axle 34 and differential housing 32, as just described.

I term a "free wheel" type to distinguish from a "drive on" type where tracks are provided onto which the automobile may be driven.

The head or mid section 12 is secured to the upper end of the piston B in the following described manner. The piston B is of tubular formation, as clearly shown in Figure 5 and has welded to its upper end, a flange 36. The flange 36 is bolted to the head 12 by means of a series of bolts 38. The piston B extends beyond the upper surface of the flange 36 and engages a bore 40 in the head 12, whereby the piston is properly aligned relative to the head 12.

The piston B extends into the cylinder C and the lower end thereof normally rests on a closed end 42 of the cylinder C, as shown in Figure 5. The piston B is guided relative to the cylinder C by means of a pair of guide rings 44 and 46. The guide rings 44 and 46 are secured to the cylinder C and boring holes through the cylinder C and into the rings and then welding the two parts together by filling the hole with melted metal 48 by a welding process. The rings 44 and 46 thus form a pair of spaced bearings in which the piston B is slidably mounted.

Above the ring 46 I provide a packing consisting of a packing ring 50 of triangular cross section, a plurality of packing rings 52 of inverted V-shape construction, and a packing ring 54 of rectangular cross section. The packing rings 50, 52 and 54 are securely clamped against the ring 46 by a gland washer 56. A flange 58 is welded or otherwise secured to the upper end of the cylinder C and is provided with a series of studs 60, extending through the washer 56. Nuts 62 are provided for drawing the washer 56 toward the flange 58 and thereby compressing the packing rings 50, 52, and 54. This construction effectively prevents the leakage of the lifting liquid from the cylinder C and around the piston B.

In the installation of my device, it is necessary to bore but one opening in the ground 64. A footing 66 of cement is then placed in the bottom of such opening and in the event that there is a cement floor 68 where the installation is being made, the flange 58 rests on top of such floor and the closed end 42 of the cylinder rests on the footing 66.

I have termed my lifting unit as being "self-contained" and this is because of the operating mechanism of the lifting unit is all contained within the piston B and the piston B is contained within the cylinder C when the lift is in lowered position. Thus, the only thing projecting above the floor 68 when the lift is in lowered position, is the superstructure A, the mechanism all being contained within the cylinder C.

It is therefore unnecessary to provide pits for the operating mechanism of the lift and this considerably facilitates installation and the mechanism is mounted out of the way. The lifting mechanism consists of a motor 70, a pump structure F and a release valve device G. The motor 70 is mounted in the upper end of the piston B, while the pump structure F and release valve G are mounted in the lower end thereof.

The piston B is provided with an inwardly extending flange 72 closed by means of a supporting plate 74. The plate 74 may be bolted to the flange 72 with a gasket interposed between the plate and the flange. The flange 72 is preferably provided with a bore 76 to receive an annular shoulder 78 formed on the plate 74.

The pump structure F consists of a casing 78 formed on the supporting plate 74 and having a cover plate 80. A drive rotor is provided within the casing 78 and consists of a disk 82 having downwardly extending teeth 84 formed thereon. A stud 86 is secured to the cover plate 80 and has a pinion 88 journaled thereon. The pinion 88 is driven by the teeth 84 of the rotor, as shown in Figure 7. The center of the rotor and the stud 86 are offset relative to each other, whereby a space is left between one side of the pinion 88 and the teeth 84. A crescent-shaped filler wall 90 is provided in this space.

The disk 82 is provided with a hub 92 to which is secured a drive shaft 94. The drive shaft 94 extends upwardly through a packing gland 96 and is operatively connected with the motor 70 by means of a tubular shaft connection 98 and interfitting jaw connectors 100. The motor 70 has an upper end plate 102 provided with a plurality of ears 104. The ears 104 are adapted to be secured in a recess formed in the head 12 by means of cap screws or the like 106. The plate 102 is provided with an annular shoulder 108 adapted to contact with the bore 40 of the head 12 for properly centering the motor 70 relative to the piston B.

The bore 76 in the flange 72 properly centers the pump structure F relative to the cylinder B, whereby the pump structure and the motor are in exact alignment to prevent binding of the shaft connection between them.

The pump structure F is provided with an inlet port 110 (see Figure 7) and an outlet port 112. A pipe connection 114 is made with the port 110 and terminates in a check valve 116. A screen covering 118 is provided around the check valve 116.

The release valve G consists of fitting 120 provided with a valve seat 122. A valve plug 124 is normally constrained toward engagement with the valve seat 122 to the action of a valve spring 126. A valve stem 128 is provided on the valve plug 124. The fitting 120 communicates by means of a nipple 130 with the undersurface of the supporting plate 74.

A sack-like screen strainer 132 extends into the nipple 130 and has its lower end closed and secured in position by means of cap screws 134, which are provided for holding the cover plate 80 in position.

A tubular extension 136 is provided on the fitting 120 and is adapted to receive a valve actuating rod 138. The rod 138 extends upwardly through the piston B and terminates in a flat bar 140 extending through a slot 142 in the end plate 102 of the motor 70.

A release valve lever 144 is provided for engaging the upper end of the bar 140. The lever 144 is pivoted on a pin 146 which in turn is supported in a forked head 148 of a bolt 150, as shown in Figure 11. A socket 152 is provided for the head 148 and a slot 154 is provided for the lever 144. The socket 152 and the slot 154 are formed in the head 12.

A wing 156 is adjustably secured to one end of the lever 144 and is adapted to be engaged by an actuating pin 158. The pin 158 is secured to a collar 160 mounted on a release control rod 162. The pin 158 is mounted off center relative to the rod 162, whereby upon rotation of the rod, the pin 158 may move from the position shown in Figure 10 in solid lines to the dotted line position for thereby raising the outer end of the lever 144 and lowering the inner end thereof for opening the release valve G.

A hand lever 164 may be formed on the outer end of the release control rod 162. The rod 162 is journaled in bearings 166 welded to one of the rails 10, whereby all the mechanism for operating the release valve is carried by the piston and superstructure.

A slot 168 is provided in the head 12, as shown in Figure 9, through which a conduit 170 extends. The conduit 170 extends along one of the rails 10 and terminates in a socket member 172. A detachable coacting socket member 174 having prongs 176 may be connected with the socket member 172. The socket member 174 has extending to it, a flexible cable 178 adapted to be connected with the prongs 176. The prongs 176 are adapted to coact with contact sockets in the member 172 for supplying current through wires 180 in the conduit 170 and to the motor 70. Thus, when it is desired to operate the motor the socket member 174 may be plugged into the socket member 172. In addition to this a control switch may be provided if desired.

Before the device is put in use, it must be filled with oil to approximately the level indicated in Figure 5. This oil may be of any suitable character, such as lubricating oil thinned by the addition of kerosene. The oil serves to lubricate all parts of the pump and release valve structure and also works up in to the lower bearing of the motor 70.

Practical operation

In the operation of my device, assuming that the lift is in its lowermost position, the rails 10 will be slightly spaced above the floor 68, as clearly shown in Figure 5. The automobile E may now be driven over the superstructure A (the rails 10 being closer together than the distance between the tires of the automobile). The automobile E is of course, driven to a position where it most nearly balances relative to the piston B.

The accessory devices 22 and D may now be slid to suitable position directly beneath the front axle 34 and differential housing 32 of the automobile E. This is easily accomplished by means of a tool 180 consisting of a rod having hooked ends. The hooked ends may be inserted in openings 182 in the device D, as shown in Figure 2 or in the openings 26 for moving the devices 22.

The automobile may now be lifted by connecting the cable 178 with the conduit 170 by means of causing coaction between the socket members 172 and 174. This will cause the motor 70 to be energized for rotating the shaft connection 98 and consequently the pump rotor having the teeth 84. The direction of rotation is indicated by the arrow 184 in Figure 7. Such rotation will also be imparted to the pinion 99 and oil receiving pockets will be formed by the teeth 84 and by those of the pinion and such oil will be carried from the inlet opening 110 to the outlet opening 112.

This causes the oil to be drawn through the screen 118 and through the check valve 116 directly above the plate 74 and discharged directly therebelow. Such movement of the oil from the reservoir formed within the piston B into the cylinder C will effectively produce an upward movement of the piston relative to the cylinder.

When the lift has been raised to the desired height, the current is disconnected from the motor 70, whereupon the lift will stay at the elevation it has attained and will be held there by the check valve 116, which prevents the natural return of the oil from the cylinder C to the reservoir within the piston B, due to the weight of the movable portion of the lifting device and the weight of the automobile E.

The superstructure A may now be easily rotated to any desired position for gaining access to the chassis and under-body of the automobile or this operation may be performed while raising the automobile. The lower end of the piston B rests on the surface of the oil in the cylinder which forms a practically frictionless thrust bearing, whereby ease of rotation is facilitated.

When it is desired to lower the automobile E, the release control lever 164 may be manipulated for pushing the rod 138 downwardly against the action of the spring 126 in the release valve G. This opens the release valve so that oil will flow through the strainer 132, past the valve plug 124 and out through openings 186 to be discharged into the reservoir within the piston B.

The lift may be lowered in this manner to any desired position and may be caused to remain in such position by merely releasing the lever 164 for allowing the valve 124 to be reseated by the spring 126.

In Figure 13 I have illustrated the lift at its upper limit of movement. The oil level in this instance is indicated at 188 and it will be noted that it coincides with the lower end of the check valve 116. Thus, an automatic stop to prevent over-extension of the piston relative to the cylinder is provided.

When the check valve 116 cannot receive any more oil, due to the fact that it terminates above the level of the oil, it is obvious that the lift will be raised no further, since the oil pump structure F is not made for compressing air and therefore cannot force air into the cylinder for raising the lift further.

Various advantages arise from the construction of a lift as I have herein disclosed. By placing the oil pump and the release valve at the lower closed end of the piston it is merely necessary for the oil to be transferred from one side of the closed end to the other, (which is a very short distance) either when raising or lowering the lift. Thus, is eliminated the friction of oil in long pipes extending up to a pump when mounted at the top of the device and I have found that a considerable saving is accomplished in this way, since a motor of less horse power can be used for lifting the heaviest of automobiles.

There is no loss of power in the transmission from the motor to the pump by means of a long shaft, while there is a considerable loss in transmitting oil such a distance. This loss is caused by the generation of heat as a result of friction of the oil against the inner surfaces of the conducting pipes.

The attaching flange 104 of the cover plate 102 of the motor 70 is preferably provided with a cutout opening 71 whereby oil may be poured into the piston B to replenish the oil supply therein after the lift has been assembled. The opening 71 is only for the purpose of supplying additional oil when necessary, the oil being originally placed within the ram or piston before the motor 70 is mounted in place.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an automobile lift, a cylinder, a piston therein, a head on said piston, vehicle engaging rails carried thereby, an electric motor in said piston for imparting lifting movement to said piston and said rails, said head having a groove, a conduit having one end extending through said groove and leading to said motor, a cover for said head and a plug-in connector on the other end thereof.

2. In an automobile lift, a cylinder, a piston therein, vehicle engaging rails carried thereby, an electric motor in said piston for imparting lifting movement to said piston and said rails, a conduit extending along one of said rails and having one end leading to said motor and a plug-in connector on the other end thereof and located at one end of said rail.

3. In an automobile lift, a cylinder, a piston therein, vehicle engaging rails carried thereby, an electric motor in said piston for imparting lifting movement to said piston and said rails, release means for allowing said piston and rails to lower, a pivoted lever for operating said release means and a control rod extending along one of said rails and operatively connected with said lever and having a control handle at one end of said rail.

4. In an automobile lift, a cylinder, a piston therein, vehicle engaging rails carried thereby, an electric motor in said piston for imparting lifting movement to said piston and said rails, release means for allowing said piston and rails to lower, a pivoted lever for operating said release means and a control rod extending along one of said rails and having a control handle at one end and a crank pin at its other end to coact with said lever.

5. In an automobile lift, a cylinder, a piston therein, a head on said piston, vehicle engaging rails carried thereby, an electric motor in said piston for imparting lifting movement to said piston and said rails, release means to allow said piston and rails to lower, said head having a groove, a lever therein and pivoted between its ends, one end of said lever adapted to engage said release means and means extending along one of said rails, having one end engaged with the other end of said lever and having a control on its other end whereby to impart pivotal movement to said lever from a position at the outer end of said rail.

LOUIS C. STUKENBORG.